(12) United States Patent
Koizumi

(10) Patent No.: US 11,626,132 B2
(45) Date of Patent: Apr. 11, 2023

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Gaku Koizumi, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/556,776

(22) Filed: Dec. 20, 2021

(65) Prior Publication Data

US 2022/0399036 A1    Dec. 15, 2022

(30) Foreign Application Priority Data

Jun. 15, 2021   (JP) .............................. JP2021-099427

(51) Int. Cl.
| | |
|---|---|
| *G11B 5/00* | (2006.01) |
| *G11B 11/105* | (2006.01) |
| *G11B 5/48* | (2006.01) |
| *G11B 5/60* | (2006.01) |
| *G11B 5/012* | (2006.01) |

(52) U.S. Cl.
CPC ............ *G11B 5/4826* (2013.01); *G11B 5/012* (2013.01); *G11B 5/607* (2013.01)

(58) Field of Classification Search
CPC ....... G11B 7/1263; G11B 5/1278; G11B 5/09; G11B 5/17; G11B 5/3903; G11B 20/18; G11B 5/54; G11B 2005/0021; G11B 5/6047; G11B 11/1056; G11B 11/1051; G11B 5/313
USPC ............................................ 360/59, 75, 325
See application file for complete search history.

(56) References Cited

U.S. PATENT DOCUMENTS

| | | | |
|---|---|---|---|
| 7,583,462 B2 | 9/2009 | Ohta et al. | |
| 8,339,725 B2 | 12/2012 | Ono et al. | |
| 9,679,599 B1* | 6/2017 | Feist | G11B 20/10027 |
| 9,997,186 B1* | 6/2018 | Bhargava | G11B 5/6029 |
| 10,014,009 B1* | 7/2018 | Koizumi | G11B 5/3906 |
| 10,672,419 B1* | 6/2020 | Matsumoto | G11B 5/012 |
| 2009/0237841 A1 | 9/2009 | Kurihara et al. | |
| 2009/0257145 A1 | 10/2009 | Tsuyama | |

(Continued)

FOREIGN PATENT DOCUMENTS

| | | |
|---|---|---|
| JP | 2009-259376 A | 11/2009 |
| JP | 2012-14792 A | 1/2012 |
| JP | 2014-86122 A | 5/2014 |

*Primary Examiner* — Nabil Z Hindi
(74) *Attorney, Agent, or Firm* — Allen & Overy LLP

(57) ABSTRACT

According to one embodiment, a magnetic disk device includes a magnetic disk, a magnetic head, a control unit, and a setting unit. The magnetic head includes a write element which writes data to the magnetic disk and heater elements which adjust a levitation amount relative to the magnetic disk. The setting unit sets a heater value to be set on the basis of a measurement result of measuring the recording quality of the data written to the magnetic disk. The control unit controls electric power to be supplied to the heater elements on the basis of the heater value to be set to the setting unit.

4 Claims, 11 Drawing Sheets

(56) References Cited

U.S. PATENT DOCUMENTS

2014/0118861 A1   5/2014  Funayama
2018/0061444 A1*  3/2018  Sato .................... G11B 5/6076

* cited by examiner

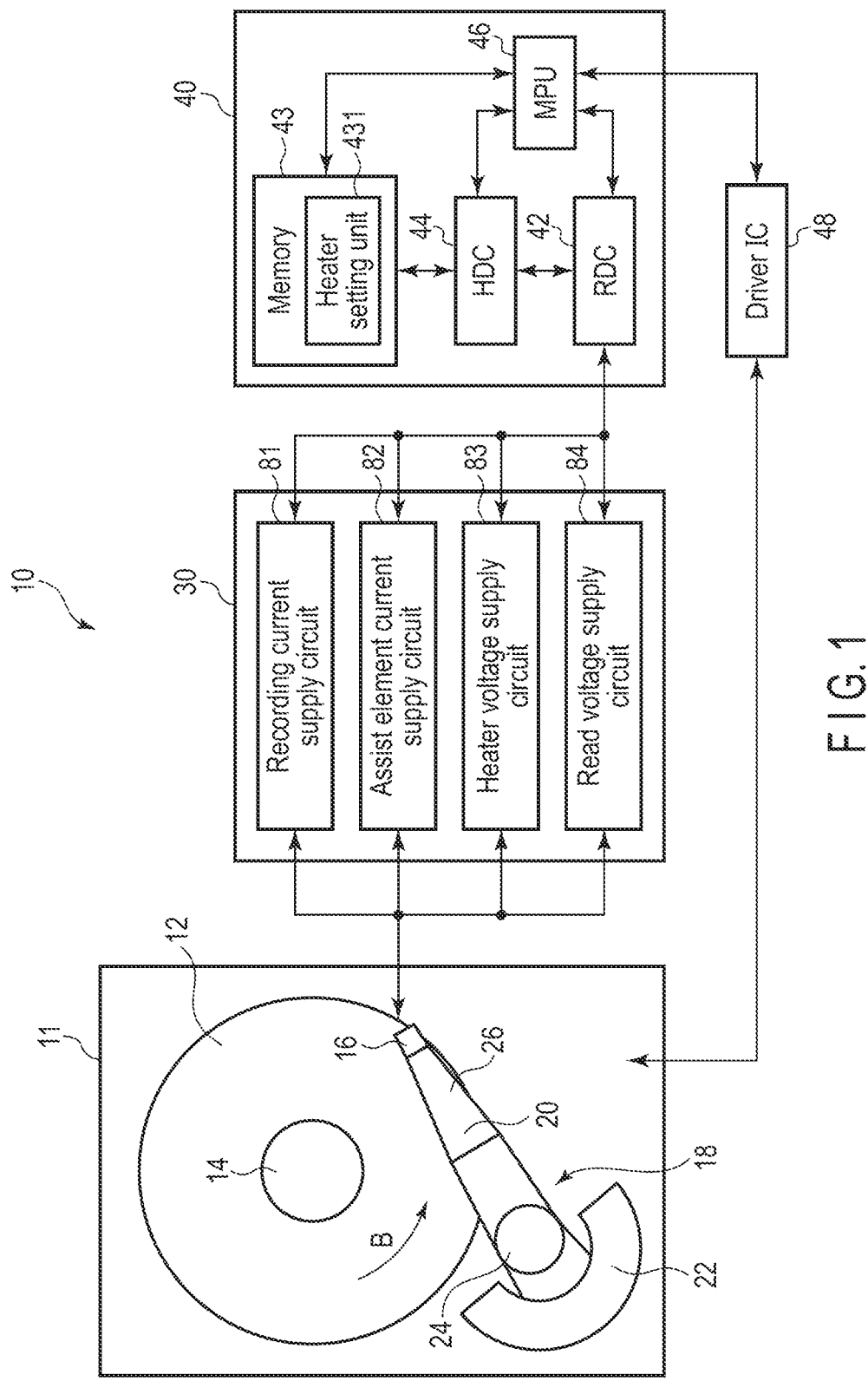
F I G. 1

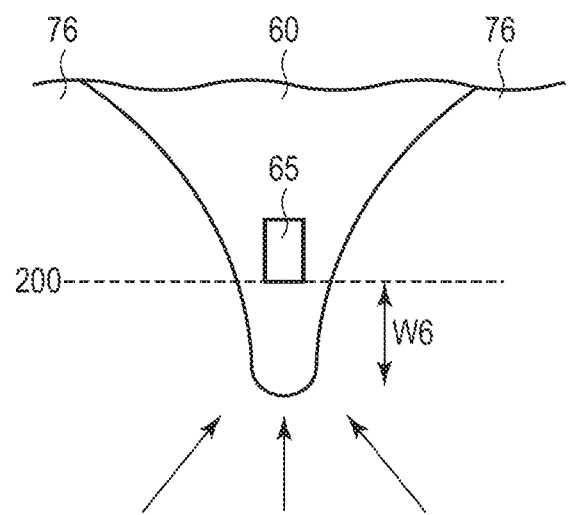
F I G. 15
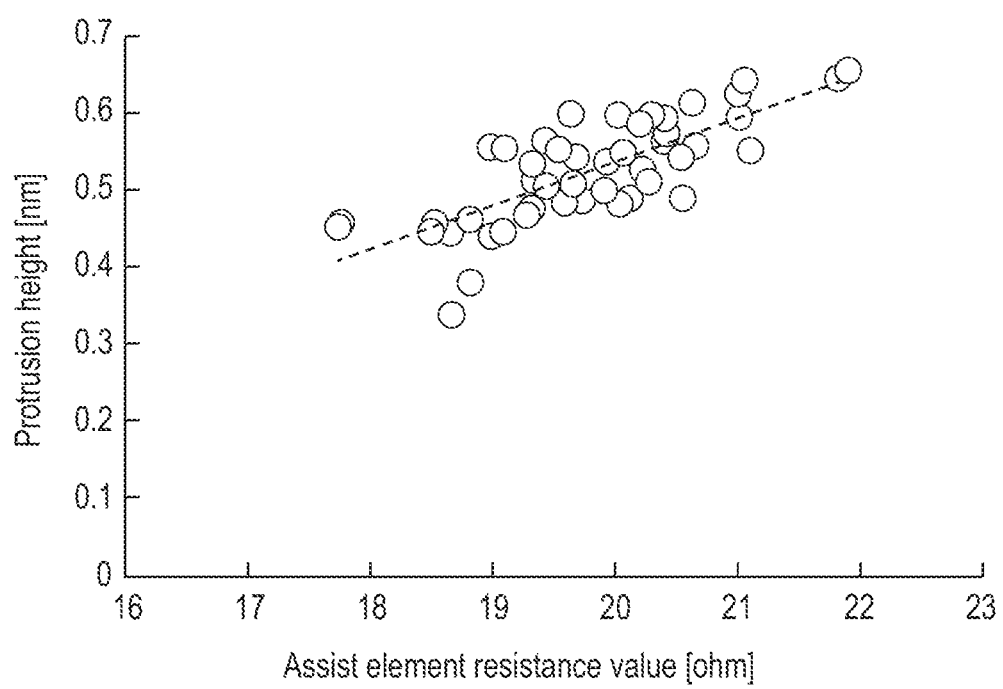
F I G. 16

MAGNETIC DISK DEVICE

CROSS-REFERENCE TO RELATED APPLICATIONS

This application is based upon and claims the benefit of priority from Japanese Patent Application No. 2021-099427, filed Jun. 15, 2021, the entire contents of which are incorporated herein by reference.

FIELD

Embodiments described herein relate generally to a magnetic disk device.

BACKGROUND

A technique of shaving, in a downstream process of manufacturing a magnetic head, an element included in a magnetic head by polishing and ion beam etching to thereby adjust the element height is known.

As described above, by reducing the height of the element by shaving, the unevenness of the main pole part changes according to the width of the magnetic pole. More specifically, the greater the width of the magnetic pole, the greater the protrusion height becomes. For this reason, particularly in the case of a magnetic head having a larger magnetic pole width, there is sometimes a case where contact between the magnetic disk surface and protruding part occurs. As described above, when the contact between the main pole part and magnetic disk surface occurs, abrasion and contamination at the main pole part become liable to occur.

Embodiments described herein aim to provide a magnetic disk device capable of preventing the main pole part from coming into contact with the magnetic disk surface.

BRIEF DESCRIPTION OF THE DRAWINGS

FIG. 1 is a block diagram schematically showing an example of the configuration of a magnetic disk device according to a first embodiment.

FIG. 15 is a view showing an example of a state where the amount of shaving the recording-head main-pole film-forming surface according to the second embodiment is large.

FIG. 16 is a view showing examples of a protrusion height relative to an assist element resistance value according to the second embodiment.

DETAILED DESCRIPTION

Figure 2:
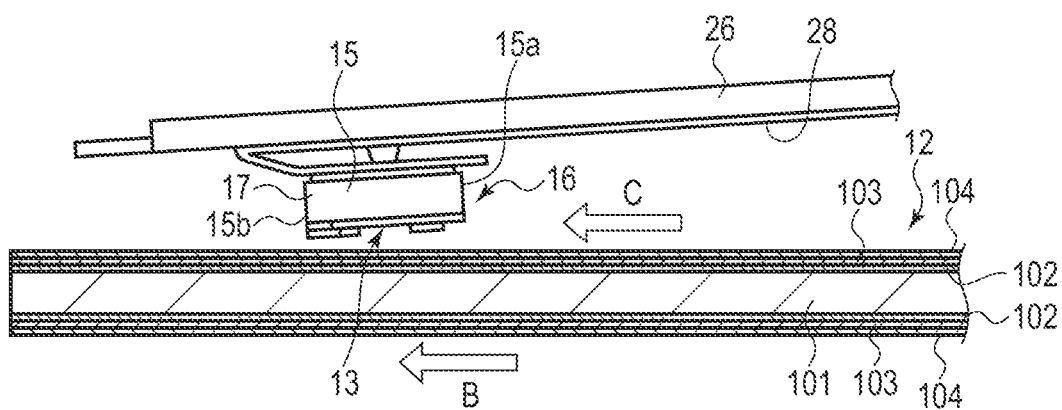
FIG. 2 is a side view showing an example of a magnetic head in a levitated state and magnetic disk according to the first embodiment.

In general, according to one embodiment, a magnetic disk device comprises a magnetic disk, a magnetic head, a control unit, and a setting unit. The magnetic head includes a write element which writes data to the magnetic disk and heater elements which adjust a levitation amount relative to the magnetic disk. The setting unit sets a heater value to be set on the basis of a measurement result of measuring the recording quality of the data written to the magnetic disk. The control unit controls electric power to be supplied to the heater elements on the basis of the heater value to be set to the setting unit. According to another embodiment, a magnetic disk device comprises a magnetic disk, a magnetic head, a control unit, and a setting unit. The magnetic head includes a write element which writes data to the magnetic disk, heater elements which adjust a levitation amount relative to the magnetic disk, and an assist element which assists the write element in writing data. The setting unit sets a heater value to be set on the basis of a resistance value of the assist element. The control unit controls electric power to be supplied to the heater elements on the basis of the heater value to be set to the setting unit.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. Further, in the specification and drawings, corresponding elements are denoted by like reference numerals, and a detailed description thereof may be omitted unless otherwise necessary.

First Embodiment

Figure 3:
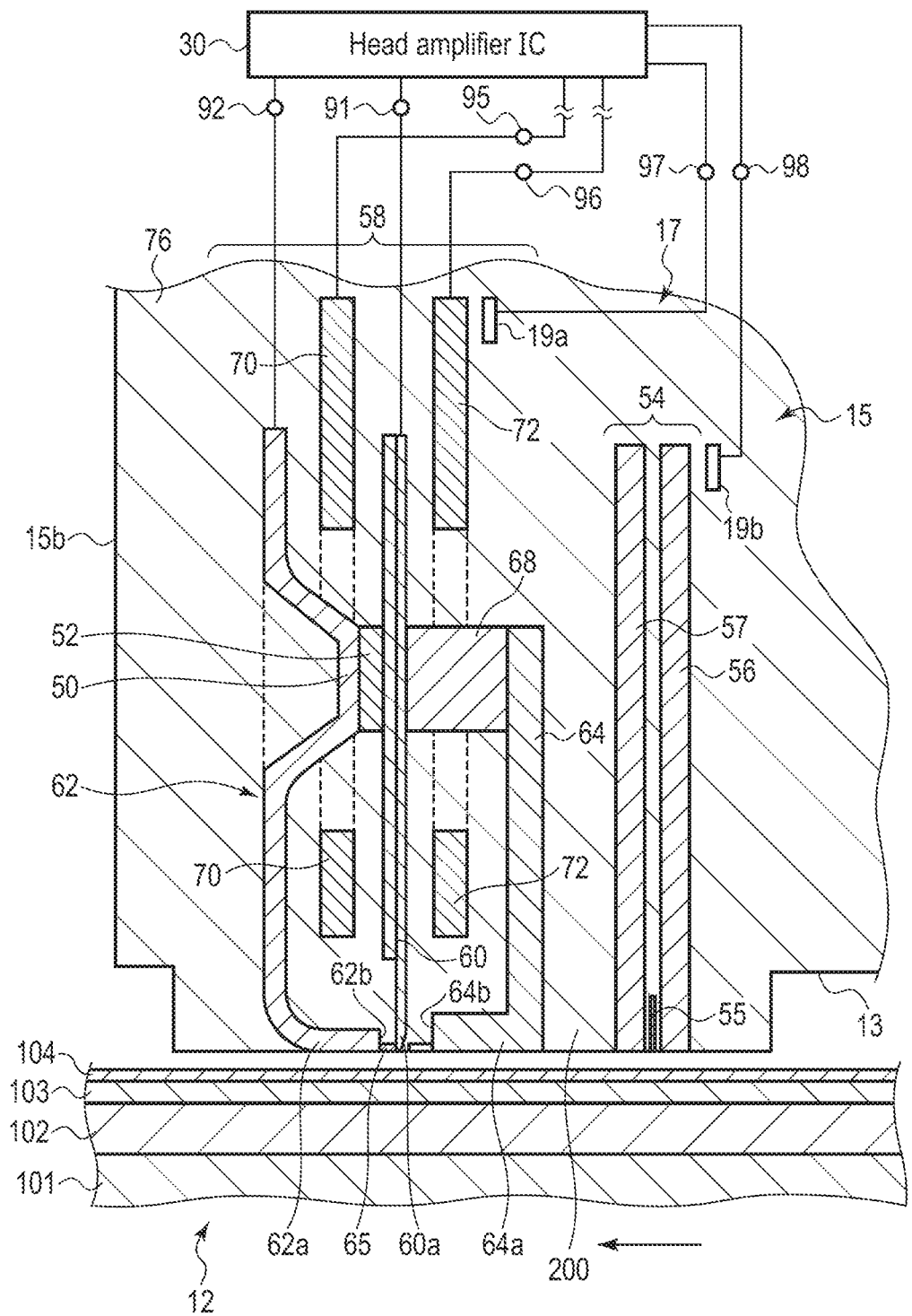
FIG. 3 is cross-sectional view schematically showing the head part of the magnetic head and magnetic disk according to the first embodiment by partial enlargement.

FIG. 1 is a block diagram schematically showing an example of the configuration of a hard disk drive (hereinafter referred to as an "HDD") which is a magnetic disk device according to a first embodiment. FIG. 2 is a side view showing an example of a magnetic head in a levitated state and magnetic disk. FIG. 3 is cross-sectional view schematically showing the head part of the magnetic head and magnetic disk by partial enlargement.

As shown in FIG. 1, the HDD 10 includes a rectangular housing 11, magnetic disk 12 serving as a recording medium arranged inside the housing 11, spindle motor 14 configured to support thereon and rotate the magnetic disk 12, and a plurality of magnetic heads 16 configured to carry out write/read of data to/from the magnetic disk 12. Further, the HDD 10 includes a head actuator 18 configured to move and position the magnetic heads 16 to an arbitrary track on the magnetic disk 12. The head actuator 18 includes an suspension assembly 20 configured to movably support the magnetic heads 16 thereon and voice coil motor (VCM) 22 configured to swing the suspension assembly 20.

The HDD 10 includes a head amplifier IC 30, main controller 40, and driver IC 48. The head amplifier IC 30 is provided in, for example, the suspension assembly 20 and is electrically connected to the magnetic heads 16. The main controller 40 and driver IC 48 are configured on a control circuit board (not shown) provided on, for example, the back surface side of the housing 11. The main controller 40 includes an R/W channel (RDC) 42, memory 43, hard disk controller (HDC) 44, and microprocessor (MPU) 46. The main controller 40 is electrically connected to the head amplifier IC 30 and is electrically connected to the VCM 22 and spindle motor 14 through the driver IC 48. The R/W channel (RDC) 42 outputs a recording signal to the magnetic heads 16 or decodes a reproduced signal read from the magnetic head 16. The memory 43 includes a heater setting unit 431. To the heater setting unit 431, heater values which are values of voltages to be supplied to heaters 19a and 19b to be described later are set. Details of how the heater values are set will be described later. The hard disk controller (HDC) 44 constitutes an interface with the host computer. The HDD 10 can be connected to the host computer (not shown) through the hard disk controller (HDC) 44.

Further, the head amplifier IC 30 includes a recording current supply circuit 81, assist element current supply circuit 82, heater voltage supply circuit 83, and read voltage supply circuit 84. The recording current supply circuit 81 supplies a current to the recording head (including a write element) 58. The assist element current supply circuit 82 supplies a current to an assist element 65. The heater voltage supply circuit 83 applies voltages to the heater 19a and heater 19b (heater elements). The read voltage supply circuit 84 applies a voltage to the reproducing head (including a read element) 54. Each of the recording current supply circuit 81, assist element current supply circuit 82, heater voltage supply circuit 83, and read voltage supply circuit 84 is electrically connected to the RDC 42. Further, the recording current supply circuit 81, assist element current supply circuit 82, heater voltage supply circuit 83, and read voltage supply circuit 84 are electrically connected to the recording head 58, assist element 65, heater 19a and heater 19b, and reproducing head 54, respectively, the recording head 58, assist element 65, heater 19a and heater 19b, and reproducing head 54 being included in the magnetic head 16.

As shown in FIG. 1 and FIG. 2, the magnetic disk 12 is a perpendicular magnetic recording medium including a recording layer having anisotropy in the direction perpendicular to the disk surface. More specifically, the magnetic disk 12 includes a substrate 101 constituted of a nonmagnetic material formed into a disk-like shape having a diameter of, for example, about 2.5 inches (6.35 cm). In each surface of the substrate 101, a soft magnetic layer 102 serving as a foundation layer, and magnetic recording layer 103 and protective film 104 both arranged in the upper layer part of the soft magnetic layer 102 are stacked in sequence on top of each other in layers. The magnetic disk 12 is coaxially fitted on a hub of the spindle motor 14. The magnetic disk 12 is rotated by the spindle motor 14 at a predetermined rotational speed in the direction of the arrow B.

The suspension assembly 20 includes a bearing unit 24 rotatably fixed to the housing 11 and a plurality of suspensions 26 extending from the bearing unit 24. As shown in FIG. 2, each of the magnetic heads 16 is supported on the extension end of each of the suspensions 26. The magnetic head 16 is electrically connected to the head amplifier IC 30 through a wiring member 28 provided on the suspension assembly 20.

Next, the configuration of the magnetic head 16 will be described in detail.

As shown in FIG. 2 and FIG. 3, the magnetic head 16 is configured as a levitation-type head and includes a slider 15 formed into a shape of an approximately rectangular parallelepiped and head unit 17 formed at an end part on the outflow end (trailing) side of the slider 15. The slider 15 is formed of, for example, a sintered body (AlTiC) of alumina and titanium-carbide and head unit 17 is constituted of a thin film having a plurality of layers.

The slider 15 includes a rectangular ABS (air-borne surface) 13 opposed to the surface of the magnetic disk 12. The slider 15 is kept in a state where the slider 15 is levitated from the surface of the magnetic disk 12 by a predetermined amount owing to an airflow C occurring between the disk surface and ABS 13 by the rotation of the magnetic disk 12. The direction of the airflow C is coincident with the rotational direction B of the magnetic disk 12. The slider 15 includes a leading end 15a positioned on the inflow side of the airflow C and trailing end 15b positioned on the outflow side of the airflow C.

As shown in FIG. 3, the head unit 17 is a discrete type magnetic head in which the reproducing head 54 and recording head 58 are formed at the trailing end 15b of the slider 15 by the thin-film process. In order to control the recording/reproducing levitation amount of the head unit 17, a recording heater 19a is arranged on the deeper side of the recording head 58, and reproducing heater 19b is arranged on the deeper side of the reproducing head 54.

The reproducing head 54 is constituted of a reproducing element (read element) 55 formed of a magnetic film exhibiting a magneto-resistance effect, and upper shield 56 and lower shield 57 formed by arranging shield films on the trailing side and leading side of the reproducing element 55 in such a manner as to put the magnetic film in between. Lower ends of the reproducing element 55, upper shield 56, and lower shield 57 are exposed at the ABS 13 of the slider 15. The reproducing head 54 is connected to the head amplifier IC 30 through an electrode, wiring, and wiring member 28 which are not shown, and outputs read data to the head amplifier IC 30.

The recording head 58 is provided on the trailing end 15b side of the slider 15 relatively to the reproducing head 54. The recording head 58 includes a main pole (write element) 60 constituted of a high magnetic permeability material configured to generate a recording magnetic field in the direction perpendicular to the surface of the magnetic disk 12, return magnetic pole 62 functioning as a trailing shield (write shield, first shield), and leading core 64 functioning as a leading shield (second shield). The main pole 60 and return magnetic pole 62 constitute a first magnetic core forming a magnetic path, and main pole 60 and leading core 64 constitute a second magnetic core forming a magnetic path. The recording head 58 includes a first coil (recording coil) 70 wound around the first magnetic core and second coil (recording coil) 72 wound around the second magnetic core.

As shown in FIG. 3, the main pole 60 extends approximately perpendicular to the surface of the magnetic disk 12. A tip end part 60a of the main pole 60 on the magnetic disk 12 side is thinned down in a tapering manner toward the disk surface to be formed in such a manner that the cross section thereof has, for example, a trapezoidal shape. A tip end face of the main pole 60 is exposed at the ABS 13 of the slider 15. The width of a trailing side end face 60b of the tip end part 60a is approximately correspondent to the track width of the magnetic disk 12.

The return magnetic pole 62 formed of a soft magnetic material is arranged on the trailing side of the main pole 60 and is provided for the purpose of efficiently closing the magnetic path through the soft magnetic layer 102 of the magnetic disk 12 immediately under the main pole 60. The return magnetic pole 62 is formed approximately L-shaped and includes a first connection part 50 to be connected to the main pole 60. The first connection part 50 is connected to an upper part of the main pole 60, i.e., a part of the main pole 60 separate from the ABS 13 through a nonconductive material 52.

The tip end part 62a of the return magnetic pole 62 is formed into a long and thin rectangular shape and tip end face thereof is exposed at the ABS 13 of the slider 15. The leading side end face 62b of the tip end part 62a extends in the track width direction of the magnetic disk 12 and extends approximately perpendicular to the ABS 13. The leading side end face 62b is opposed to the trailing side end face 60b of the main pole 60 approximately in parallel therewith with a write gap WG held between them.

The first coil 70 is arranged in such a manner as to be wound around a magnetic circuit (first magnetic core) including the main pole 60 and return magnetic pole 62. The first coil 70 is wound around, for example, the first connection part 50. At the time of writing a signal to the magnetic disk 12, a recording current is made to flow through the first coil 70, whereby the first coil 70 excites the main pole 60 to make a magnetic flux flow through the main pole 60.

The assist element 65 is provided inside the write gap WG between the tip end part 60a of the main pole 60 and return magnetic pole 62, and a part thereof is exposed at the ABS 13. The assist element 65 is constituted of, for example, a high-frequency assist element or thermal assist element. It should be noted that the lower end face of the assist element 65 is not limited to the case where the lower end face is positioned flush with the ABS 13, and may be upwardly separate from the ABS 13 in the height direction.

As shown in FIG. 3, connection terminals 91 and 92 are respectively connected to the main pole 60 and return magnetic pole 62, and these connection terminals 91 and 92 are connected to the head amplifier IC 30 through the wiring. Thereby, a current circuit is configured in such a manner as to be able to make a current flow from the head amplifier IC 30 in series through the main pole 60, the assist element 65 and return magnetic pole 62. Further, connection terminals 97 and 98 are respectively connected to the recording heater 19a and reproducing heater 19b, and these connection terminals 97 and 98 are connected to the head amplifier IC 30 through the wiring.

As shown in FIG. 3, the leading core 64 formed of a soft magnetic material is provided on the leading side of the main pole 60 in opposition to the main pole 60. The leading core 64 is formed approximately L-shaped, and tip end part 64a thereof on the magnetic disk 12 side is formed into a long and thin rectangular shape. The tip end face (lower end face) of the tip end part 64a is exposed at the ABS 13 of the slider 15. The trailing side end face 64b of the tip end part 64a extends in the track width direction of the magnetic disk 12. The trailing side end face 64b is opposed to the leading side end face of the main pole 60 with a gap held between them. This gap is covered with a protective insulating film 76 functioning as a nonmagnetic material.

The leading core 64 includes a second connection part 68 joined to a back gap formed between the main pole 60 and second connection part 68 at a position separate from the magnetic disk 12. The second connection part 68 is formed of, for example, a soft magnetic material and constitutes a magnetic circuit together with the main pole 60 and leading core 64. The second coil 72 of the recording head 58 is arranged in such a manner as to be wound around a magnetic circuit (second magnetic core) including the main pole 60 and leading core 64, and applies a magnetic field to the magnetic circuit. The second coil 72 is wound around, for example, the second connection part 68. It should be noted that a nonconductive material or nonmagnetic material may be inserted into a part of the second connection part 68.

The second coil 72 is wound in the direction reverse to the first coil 70. The first coil 70 and second coil 72 are respectively connected to the terminals 95 and 96, and these terminals 95 and 96 are connected to the head amplifier IC 30 through the wiring. The second coil 72 may be connected in series to the first coil 70. Further, regarding the first coil 70 and second coil 72, supply of an electric current to each of the coils 70 and 72 may be controlled separately from each other. An electric current to be supplied to each of the first coil 70 and second coil 72 is controlled by the head amplifier IC 30 and main controller 40.

Next, an example of the levitated state of the magnetic head 16 will be described.

Figure 4:
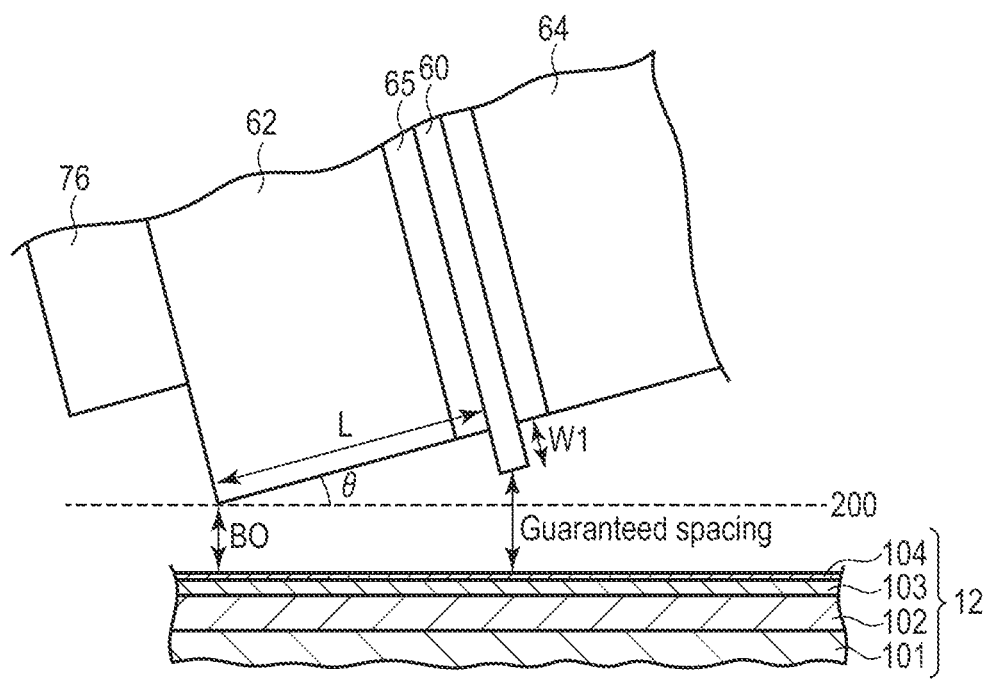
FIG. 4 is a cross-sectional view schematically showing a recording head tip end part of the magnetic head in the levitated state and magnetic disk according to the first embodiment by partial enlargement.
Figure 5:
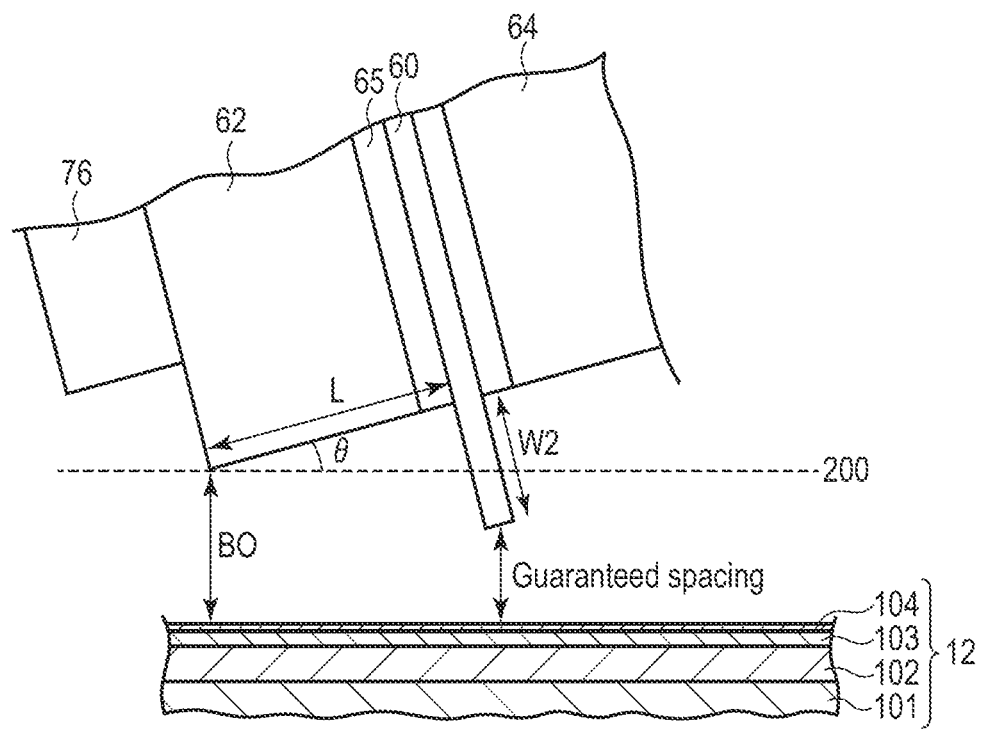
FIG. 5 is a cross-sectional view schematically showing the recording head tip end part of the magnetic head in the levitated state and magnetic disk according to the first embodiment by partial enlargement.
Figure 6:
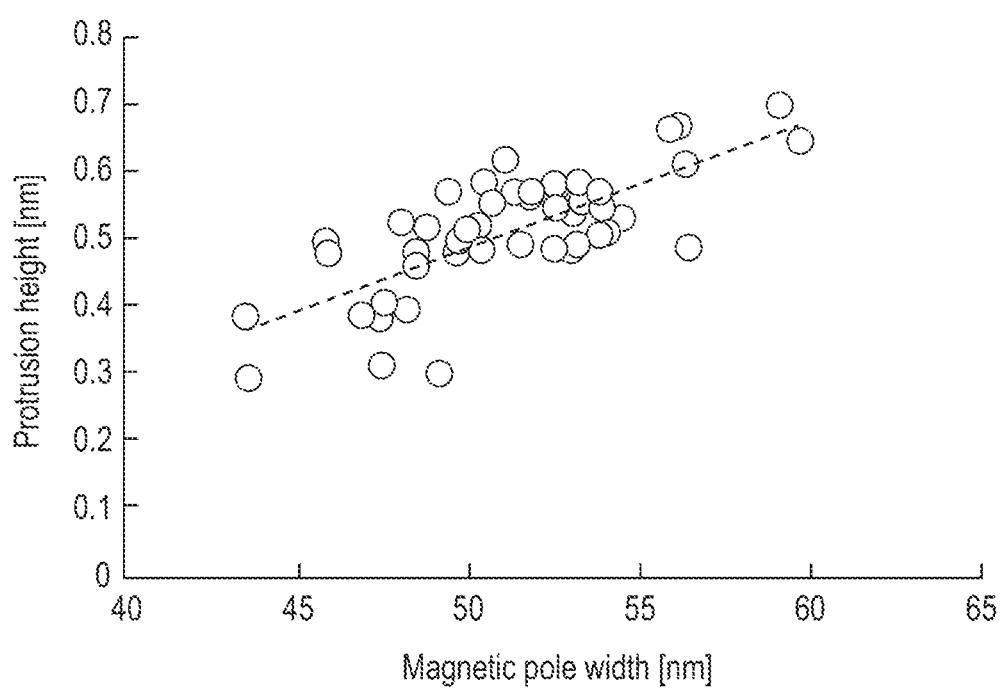
FIG. 6 is a view showing examples of a protrusion height relative to a magnetic pole width according to the first embodiment.
Figure 7:
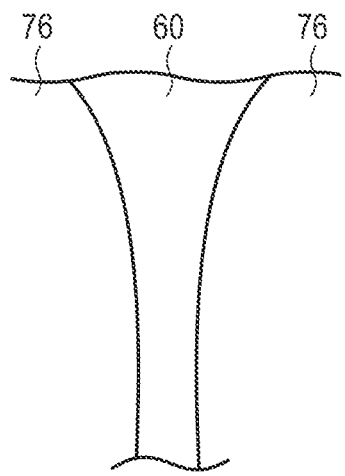
FIG. 7 is a view showing an example of a state before the downstream process of shaving the recording-head main-pole film-forming surface according to the first embodiment.
Figure 8:
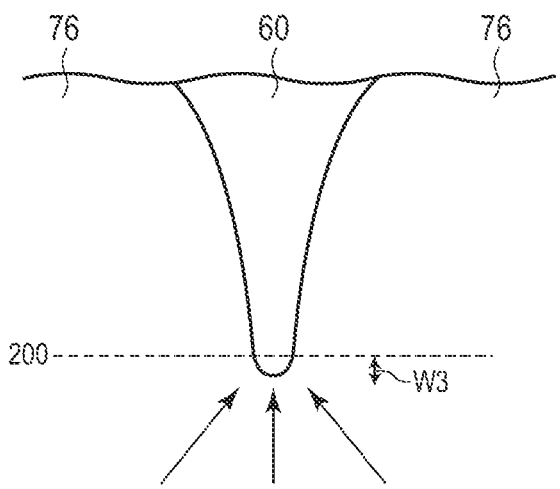
FIG. 8 is a view showing an example of a state where the amount of shaving the recording-head main-pole film-forming surface according to the first embodiment is small.
Figure 9:
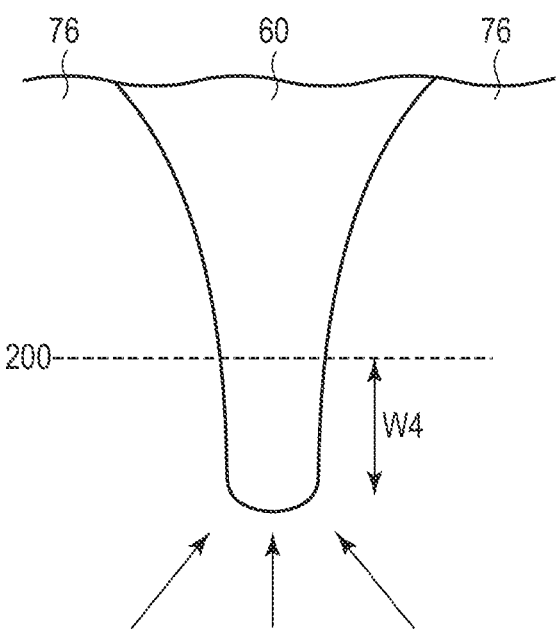
FIG. 9 is a view showing an example of a state where the amount of shaving the recording-head main-pole film-forming surface according to the first embodiment is large.

Each of FIG. 4 and FIG. 5 is a cross-sectional view schematically showing a recording head tip end part of the magnetic head 16 in the levitated state and magnetic disk 12 by partial enlargement. FIG. 6 is a view showing examples of a protrusion height relative to a main pole width. Each of FIG. 7, FIG. 8, and FIG. 9 is a cross-sectional view schematically showing a shape before or after the head downstream process at the recording-head main-pole film-forming surface of the magnetic head 16. More specifically, FIG. 7 is a view showing an example of a state before the downstream process of shaving the recording-head main-pole film-forming surface, FIG. 8 is a view showing an example of a state where the amount of shaving the recording-head main-pole film-forming surface is small, and FIG. 9 is a view showing an example of a state where the amount of shaving the recording-head main-pole film-forming surface is large.

As shown in FIG. 4, when the vicinity of the recording head of the magnetic head 16 in the state where the magnetic head 16 is levitated from the magnetic disk 12 is enlarged, the main pole part (tip end part of the main pole 60) is slightly protruded from other areas. This protrusion height W1 is, as shown in FIG. 7, FIG. 8, and FIG. 9, adjusted when the element height is reduced by shaving in the head downstream process by ion beam etching (IBE) after a polishing process such as CMP or the like in such a manner that the element height becomes coincident with the levitation plane 200. Particularly high magnetic permeability is required of the main pole part, and hence the material for the main pole part has a high content percentage of the magnetic metallic material such as Fe or Co having a low ion milling rate. For this reason, as shown in FIG. 8 and FIG. 9, the main pole part has a shape relatively protruding from the levitation plane 200. In addition, at the time of etching, as shown in FIG. 7, FIG. 8, and FIG. 9, the protrusion height W4 (>W3) of the head shown in FIG. 9 in which the width of the magnetic pole is larger becomes greater than the protrusion height W3 of the head shown in FIG. 8 in which the width of the magnetic pole is smaller partially due to the influence of milling from the side in the cross-track width direction. As a result, as shown in FIG. 6, a relationship between the magnetic pole width and protrusion height expressing that the greater the magnetic pole width, i.e., the greater the physical width of the magnetic pole, the greater the protrusion height W becomes is established.

On the other hand, as shown in FIG. 4 and FIG. 5, in order to prevent reduction in the recording capability of the recording head 16 caused by a head-disk interface (HDI) factor (hereinafter also referred to as an "HDI obstacle") such as abrasion, contamination, and medium protrusion from occurring, it is necessary to maintain the guaranteed spacing from the tip end of the main pole 60 to the disk surface. For this reason, in contrast with the head in which the width of the main pole 60 is small and protrusion height W1 is small as shown in FIG. 4, in the head in which the width of the main pole 60 is large and protrusion height W2 (>W1) is large as shown in FIG. 5, the need to increase the levitation amount back off (BO) of the whole of the slider 15 by a difference amount corresponding to the value "protrusion height×cos(θ)". Here, θ is the pitch angle at the time of levitation of the slider 15 and, in general, is 100 to 150 μrad.

In this embodiment, the width of the main pole 60 is measured in the following manner.

Figure 10:
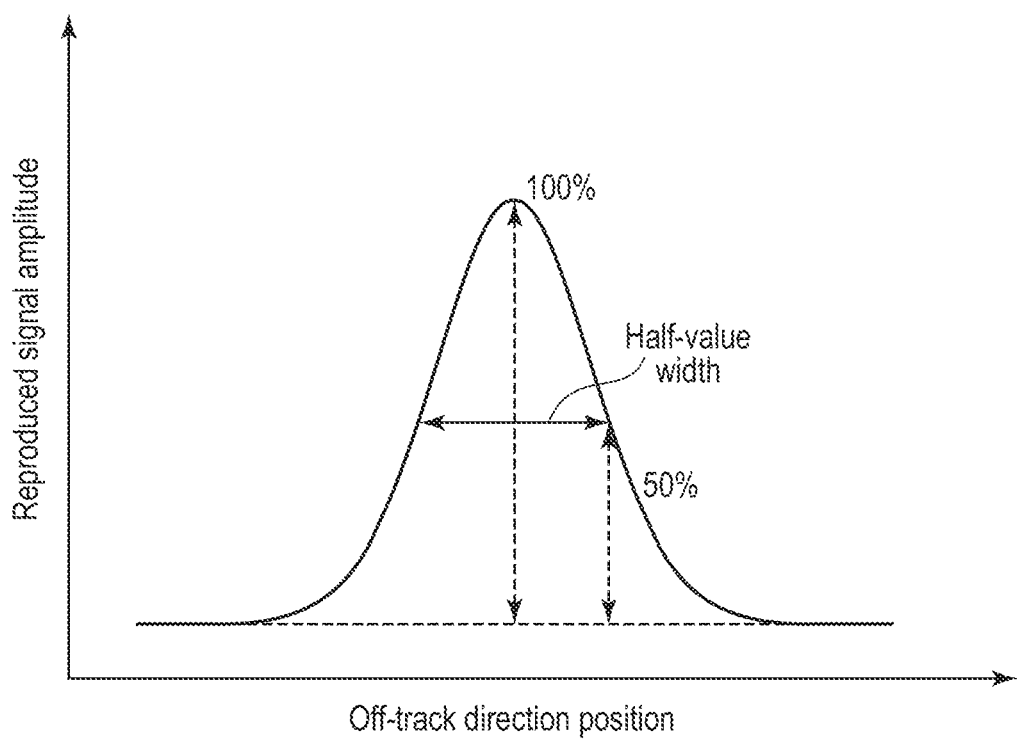
FIG. 10 is a view showing examples of a magnitude of a reproduced signal amplitude in the radial direction (off-track direction) according to the first embodiment.

FIG. 10 is a view showing examples of a magnitude of a reproduced signal amplitude relative to the off-track direction position (radial direction position). As shown in FIG. 10, the reproduced signal amplitude of one-track-written data is measured while the off-track position is changed by the RDC 42. Thereby, the MPU 46 can acquire the half-value width of the off-track profile of the amplitude. On the basis of the result of the half-value width, i.e., the width of the main pole 60, the MPU 46 sets the levitation amount of the whole of the slider 15. More specifically, the MPU 46 carries out setting in the following manner.

Figure 11:
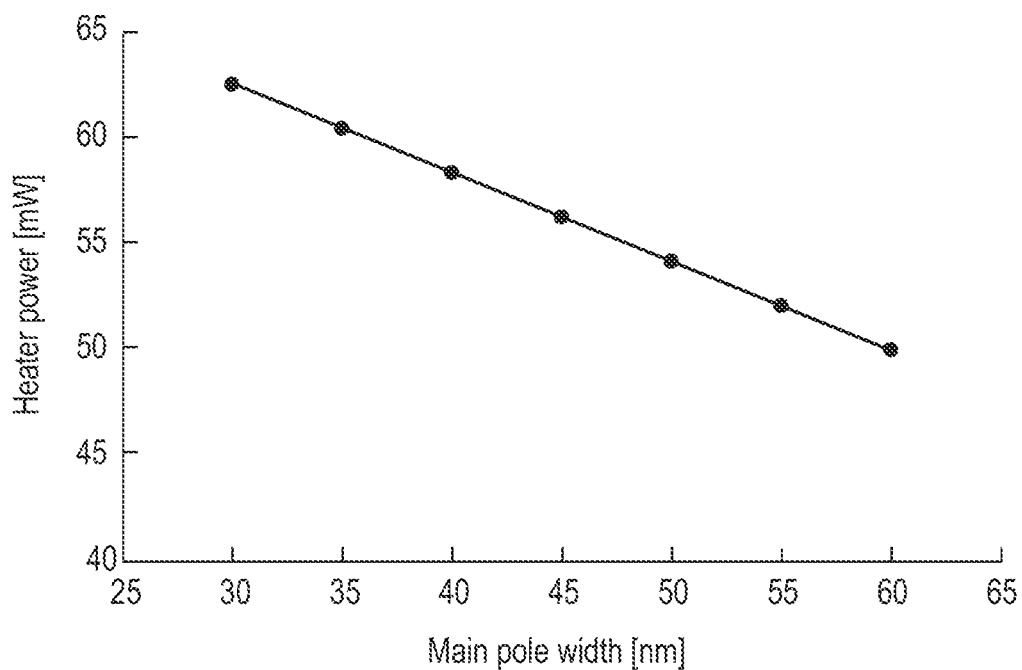
FIG. 11 is a view showing examples of a magnitude of heater power relative to a main pole width according to the first embodiment.

FIG. 11 is a view showing examples of a magnitude of heater power relative to the width of the main pole 60 (hereinafter also referred to as the "main pole width").

From FIG. 11, it can be seen that there is a proportional relationship between the main pole width and heater power. Accordingly, the MPU 46 adjusts the levitation amount of the whole of the slider 15 by changing the power of the heater 19a according to the half-value width measured as shown in FIG. 10. More specifically, the MPU 46 sets a heater value (in this embodiment, voltage value) corresponding to the measured half-value width to the heater setting unit 431 of the memory 43. This heater value is set in such a manner that the greater the half-value width, the less the electric power to be supplied to the heater 19a becomes. This heater value setting is executed at the time of, for example, shipment of the HDD 10.

It should be noted that the greater the main pole width, the better the bit error rate (BER) and overwrite (OW) characteristics become, and the BER and OW characteristics respectively have a proportional relationship with the heater power (illustration omitted). Accordingly, the MPU 46 may set the heater value to the heater setting unit 431 on the basis of the measured BER or OW. Further, when a plurality of heaters are provided in the magnetic head 16, the MPU 46 may additionally change the heater value of the heater 19b other than the heater 19a closest to the main pole at the track running direction position, and furthermore may adjust the levitation amount of the whole of the slider 15 by adjusting the electric power to be supplied to all the heaters, i.e., the overall electric power value and setting the adjusted overall electric power value to the heater setting unit 431.

Figure 12:
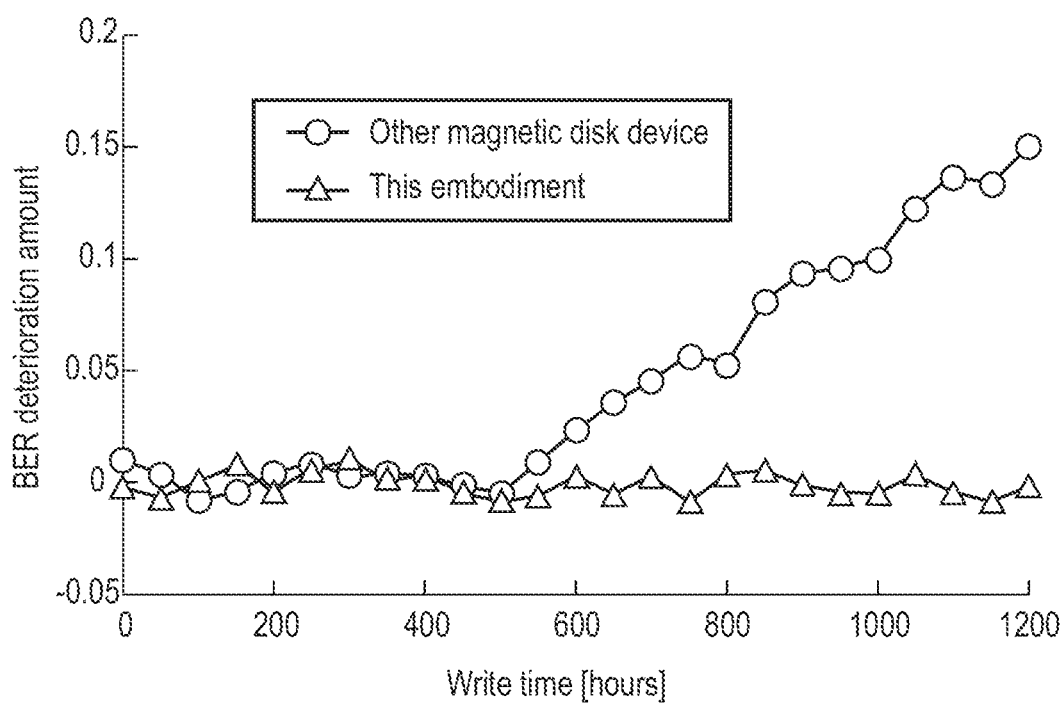
FIG. 12 is a view showing examples of a relationship of a BER deterioration amount with the write time according to the first embodiment.

FIG. 12 is a view showing examples of a relationship of the BER deterioration amount with the write time. More specifically, FIG. 12 shows examples of the variation in the bit error rate (BER) of recording data of a case where a write operation is continued for a long period of time with a magnetic head 16 having a larger magnetic pole width and larger protrusion height in each of the HDD 10 of this embodiment and the other magnetic disk device different from this embodiment. Here, the other magnetic disk device is a magnetic disk device in which the heater value of the heater setting unit 341 is not adjusted unlike the above description.

As shown in FIG. 12, in the other magnetic disk device, the levitation amount of the slider 15 is not adjusted according to the main pole width (protrusion height). Accordingly, the spacing from the tip end of the main pole 60 to the disk surface becomes relatively smaller than the spacing that can be guaranteed, and thus the reliability is lowered. When the reliability is lowered as described above, deterioration in the bit error rate occurs after an elapse of a long time. On the other hand, in the HDD 10 of this embodiment, the levitation amount of the slider 15 is adjusted according to the main pole width (protrusion height). Accordingly, it is possible to prevent abrasion or the like resulting from the lowering of the spacing in, for example, the aforementioned magnetic head 16 having a larger main pole width shown in FIG. 5 from occurring. In FIG. 12, in the HDD 10 of this embodiment, even when the write time becomes longer, it can be confirmed that the deterioration in the bit error rate can be prevented from occurring. Accordingly, it is possible for the HDD 10 to avoid contact of the main pole part with the disk surface of the magnetic disk 12, and prevent the HDI obstacle such as abrasion and contamination at the main pole part from occurring.

It should be noted that although in the first embodiment described above, the description has been given of the case where the assist element is included in the magnetic head 16, the case is not limited to the above. For example, it is possible to apply the aforementioned technique to even, for example, a magnetic disk device in which the assist element is not included in the magnetic head.

Further, although in the first embodiment described above, the description has been given by taking the case where one set of a magnetic disk 12 and magnetic head 16 is provided as an example, there is also a case where the HDD 10 includes a plurality of sets each of which is constituted of a magnetic disk 12 and magnetic head 16. In the case of an HDD 10 configured as described above, when the electric power value of the electric power to be supplied to the magnetic head 16 having the greatest half-value width among the plurality of magnetic heads 16 is defined as the first electric power value, and electric power value of the electric power to be supplied to the magnetic head 16 having the smallest half-value width is defined as the second electric power value, regarding the heater value of each magnetic head 16 to be set to the heater setting unit 431, setting to the heater value setting unit 431 may be carried out in such a manner that at least the first electric power value becomes less than the second electric power value. Furthermore, the setting may also be carried out in such a manner that the electric power value of the electric power to be supplied to the heaters 19a and 19b of all the magnetic heads 16 becomes less than the second electric power value. Thereby, even when the HDD 10 includes a plurality of sets each of which is constituted of a magnetic disk 12 and magnetic head 16, it is possible to prevent the HDI obstacle such as abrasion and contamination at the main pole part from occurring.

Second Embodiment

Although in the first embodiment described above, the description has been given of the case where the heater value is set on the basis of the width of the main pole 60, a second embodiment differs from the first embodiment in that the heater value is set on the basis of the resistance value of the assist element 65. Hereinafter, the configuration in which the heater value is set to the heater setting unit 431 on the basis of the resistance value of the assist element 65 will be described in detail. It should be noted that configurations identical to the first embodiment are denoted by reference symbols identical to the first embodiment and detailed descriptions of these configurations are omitted.

Figure 13:
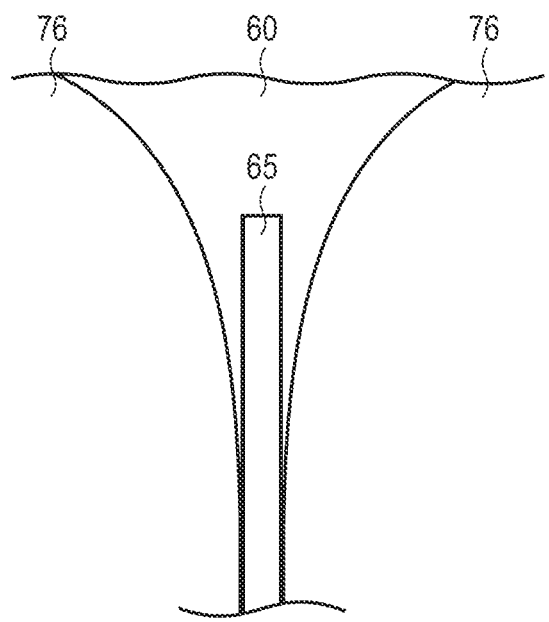
FIG. 13 is a view showing an example of a state before the downstream process of shaving the recording-head main-pole film-forming surface according to a second embodiment.
Figure 14:
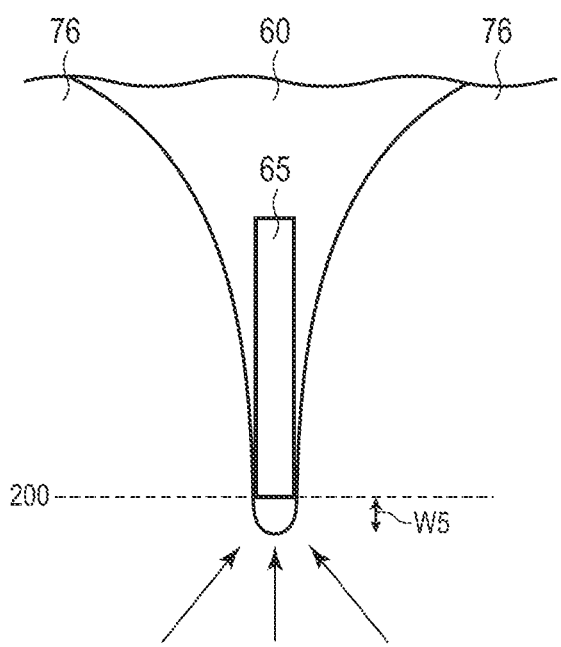
FIG. 14 is a view showing an example of a state where the amount of shaving the recording-head main-pole film-forming surface according to the second embodiment is small.

Each of FIG. 13, FIG. 14, and FIG. 15 is a cross-sectional view schematically showing a shape before or after the head downstream process at the recording-head main-pole film-forming surface of the magnetic head 16. More specifically, FIG. 13 is a view showing an example of a state before the downstream process of shaving the recording-head main-pole film-forming surface, FIG. 14 is a view showing an example of a state where the amount of shaving the recording-head main-pole film-forming surface is small, and FIG. 15 is a view showing an example of a state where the amount of shaving the recording-head main-pole film-forming surface is large. FIG. 16 is a view showing examples of a protrusion height relative to an assist element resistance value.

As shown in FIG. 5 already described above, the element height is adjusted when the element height is reduced by shaving in the head downstream process by ion beam etching (IBE) after a polishing process such as CMP or the like in such a manner that the element height becomes coincident with the levitation plane 200, this being the same as in the case of the second embodiment. Further, as shown in FIG. 13, the main pole has a shape broadening on the deeper side (upper side in FIG. 13). Accordingly, depending also on the shaving amount, the remaining width of the main pole changes and protrusion height W of the magnetic pole is thereby influenced.

As shown in FIG. 14, when the shaving amount is small, the width of the main pole becomes small, and protrusion height W5 becomes small. On the other hand, as shown in FIG. 15, when the shaving amount is large, the width of the main pole 60 becomes large, and protrusion height W6 (>W5) also becomes large. As described above, the length of the assist element 65 in the height direction (vertical direction in FIG. 15) also changes according to the shaving amount. Thereby, the resistance value itself of the assist element 65 also changes. As shown in FIG. 14, when the element length of the assist element 65 is large, the resistance value becomes low and, as shown in FIG. 15, when the element length of the assist element is short, the resistance value becomes high. As a result, as shown in FIG. 16, such a relationship that the higher the assist element resistance value, the larger the protrusion height becomes is established.

Figure 17:
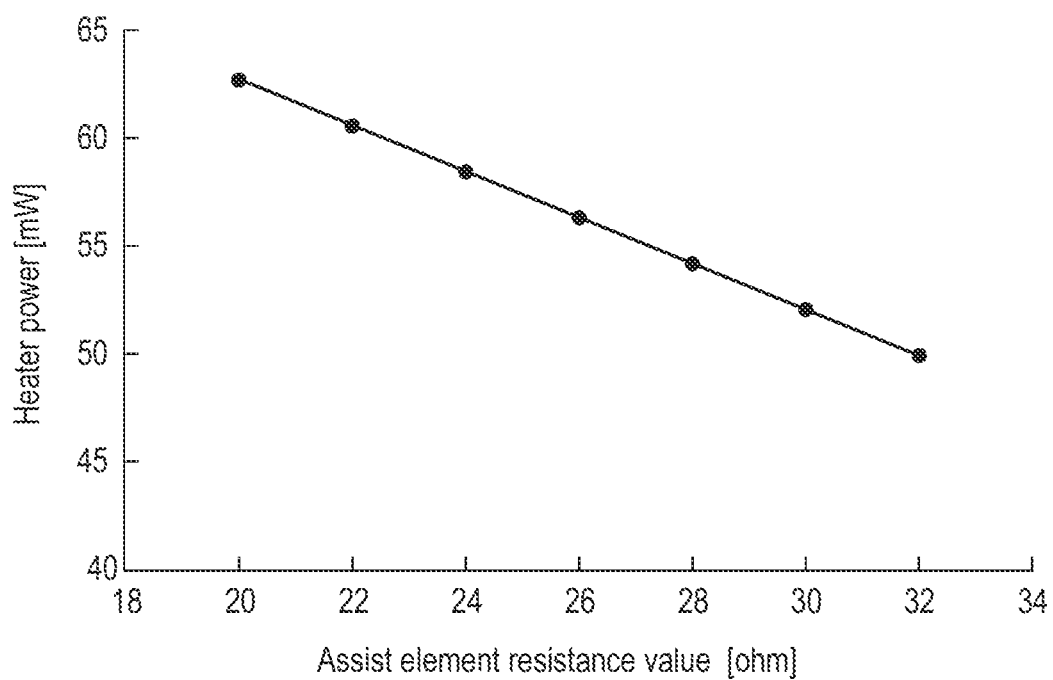
FIG. 17 is a view showing examples of a magnitude of heater power relative to an assist element resistance value according to the second embodiment.

FIG. 17 is a view showing examples of the magnitude of heater power relative to the assist element resistance value. From FIG. 17, it can be seen that there is a proportional relationship between the assist element resistance value and heater power. Accordingly, the MPU 46 adjusts the levitation amount of the whole of the slider 15 by changing the power of the heater 19a according to the measured assist element resistance value. More specifically, the MPU 46 sets a heater value (in this embodiment, voltage value) corresponding to the measured assist element resistance value to the heater setting unit 431 of the memory 43. This heater value is set in such a manner that the greater the resistance value of the assist element 65, the less the electric power to be supplied to the heater 19a becomes.

As described above, it is possible for the MPU 46 to prevent abrasion or the like resulting from the lowering of the spacing in the aforementioned magnetic head 16 having a larger magnetic pole width shown in FIG. 5 from occurring also by changing the power of the heater 19a according to the assist resistance value of the assist element 65 and adjusting the levitation amount of the whole of the slider 15. Accordingly, it is possible for the HDD 10 to avoid contact of the main pole part with the magnetic disk surface and prevent the HDI obstacle such as abrasion and contamination at the main pole part from occurring as in the case of the first embodiment.

Further, although in the second embodiment described above, the description has been given by taking the case where one set of a magnetic disk 12 and magnetic head 16 is provided as an example, there is also a case where the HDD 10 includes a plurality of sets each of which is constituted of a magnetic disk 12 and magnetic head 16. In the case of an HDD 10 configured as described above, when the electric power value of the electric power to be supplied to the magnetic head 16 having the greatest resistance value among the plurality of magnetic heads 16 is defined as the third electric power value, and electric power value of the electric power to be supplied to the magnetic head 16 having the least resistance value is defined as the fourth electric power value, regarding the heater value of each magnetic head 16 to be set to the heater setting unit 431, setting to the heater value setting unit 431 may be carried out in such a manner that at least the third electric power value becomes less than the fourth electric power value. Furthermore, the setting may also be carried out in such a manner that the electric power value of the electric power to be supplied to the heaters 19a and 19b of all the magnetic heads 16 becomes less than the fourth electric power value. Thereby, even when the HDD 10 includes a plurality of sets each of which is constituted of a magnetic disk 12 and magnetic head 16, it is possible to prevent the HDI obstacle such as abrasion and contamination at the main pole part from occurring.

Furthermore, although in the embodiments described above, the descriptions have been given of the case where the heater value is set to the heater setting unit 431 at the time of shipment of the HDD 10, the timing for setting the heater value is not limited to the above. For example, the configuration may be contrived in such a manner that the user is enabled to set the heater value again according to the environment in which the user uses the HDD 10 after shipment of the HDD 10. In this case, the graph shown in FIG. 11 indicating the relationship between the main pole width and heater power may be stored in advance in, for example, the memory 43, MPU 46 may measure the relationship between the off-track direction position and reproduced signal amplitude shown in FIG. 10 to thereby calculate the half-value width, and may set the heater value corresponding to the calculated half-value width to the heater setting unit 431. Thereby, it becomes possible for the HDD 10 to set the optimum heater value to the heater setting unit 431 according to the environment after the shipment thereof.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   a magnetic head including a write element which writes data to the magnetic disk and heater elements which adjust a levitation amount relative to the magnetic disk;
   a control unit which controls electric power to be supplied to the heater elements; and
   a setting unit to which a heater value to be set on the basis of a measurement result of measuring the recording quality of the data written to the magnetic disk is set, wherein
   the control unit controls the electric power to be supplied to the heater elements on the basis of the heater value to be set to the setting unit,
   the magnetic head includes a read element which reads the data written to the magnetic disk, and
   the heater value is set to the setting unit on the basis of a half-value width to be obtained from a measurement result of an off-track profile of a signal amplitude of the data read by the read element.

2. The magnetic disk device of claim 1, wherein
   the heater value is set to the setting unit in such a manner that the greater the half-value width, the less the electric power to be supplied to the heater element becomes.

3. The magnetic disk device of claim 1, wherein
   the magnetic disk device includes a plurality of sets each of which is constituted of the magnetic disk and the magnetic head, and
   when an electric power value of electric power to be supplied to a magnetic head the half-value width of which is the greatest among the plurality of magnetic heads is set as a first electric power value, and an electric power value of electric power to be supplied to a magnetic head the half-value width of which is the smallest is set as a second electric power value,
   the heater value is set to the setting unit in such a manner that the first electric power value becomes less than the second electric power value.

4. A magnetic disk device comprising:
   a magnetic disk;
   a magnetic head including a write element which writes data to the magnetic disk, heater elements which adjust a levitation amount relative to the magnetic disk, and an assist element which assists the write element in writing data;
   a control unit which controls electric power to be supplied to the heater elements; and
   a setting unit to which a heater value to be set on the basis of a resistance value of the assist element is set, wherein
   the control unit controls the electric power to be supplied to the heater elements on the basis of the heater value to be set to the setting unit,
   the heater value is set to the setting unit in such a manner that the greater the resistance value of the assist element, the less the electric power to be supplied to the heater element becomes,
   the magnetic disk device includes a plurality of sets each of which is constituted of the magnetic disk and the magnetic head, and
   when an electric power value of electric power to be supplied to a magnetic head the resistance value of which is the greatest among the plurality of magnetic heads is set as a third electric power value, and an electric power value of electric power to be supplied to a magnetic head the resistance value of which is the smallest is set as a fourth electric power value,
   the heater value is set to the setting unit in such a manner that the third electric power value becomes less than the fourth electric power value.

* * * * *